United States Patent [19]

Flowers et al.

[11] Patent Number: 5,050,241
[45] Date of Patent: Sep. 24, 1991

[54] GARMENT FOR PROTECTION AGAINST HOT LIQUIDS

[75] Inventors: Danny S. Flowers, Leland, N.C.; Timothy R. Wiseman, Sr., Richmond, Va.

[73] Assignee: E. I. Du Pont de Nemours and Company, Wilmington, Del.

[21] Appl. No.: 538,282

[22] Filed: Jun. 14, 1990

Related U.S. Application Data

[63] Continuation-in-part of Ser. No. 419,848, Oct. 11, 1989.

[51] Int. Cl.⁵ .......................................... A41D 13/00
[52] U.S. Cl. ................................. 2/81; 2/2; 2/167; 428/152; 428/198; 264/290
[58] Field of Search ............. 2/81, 2, 167; 428/152, 428/198; 264/290

[56] References Cited

U.S. PATENT DOCUMENTS

| | | | |
|---|---|---|---|
| 3,133,138 | 5/1964 | Alexander Jr. | 264/290 |
| 3,718,592 | 2/1973 | Prosser | 2/81 |
| 4,034,417 | 7/1977 | Ellis | 2/81 |
| 4,120,914 | 10/1978 | Behnke et al. | 2/2 |
| 4,255,817 | 3/1981 | Heim et al. | 2/2 |
| 4,395,455 | 7/1983 | Frankosky | 428/299 |
| 4,513,452 | 4/1985 | Rankin, Sr. et al. | 2/81 |
| 4,514,455 | 4/1985 | Hwang | 428/198 |
| 4,569,088 | 2/1986 | Frankenburg | 2/81 |
| 4,748,065 | 5/1988 | Tanikella | 428/152 |
| 4,750,443 | 6/1988 | Blaustein et al. | 2/8 |
| 4,768,233 | 9/1988 | Grilliot et al. | 2/81 |
| 4,833,010 | 5/1989 | Langley | 2/2 |
| 4,843,646 | 7/1989 | Grilliot et al. | 2/69 |
| 4,855,178 | 8/1989 | Langley | 2/2 |
| 4,908,260 | 3/1990 | Dobia et al. | 2/2 |

FOREIGN PATENT DOCUMENTS

| | | | |
|---|---|---|---|
| 0089875 | 11/1980 | Japan | 2/81 |
| 2199787 | 7/1988 | United Kingdom | 2/2 |

OTHER PUBLICATIONS

Fryepel Brochure Entitled "Fire Fighters Protective Clothing" Dated 1988.
Body-Guard Brochure Entitled "Body-Guard Apparel-Fire Fighter 3000 Series" Dated 3/1987.
Fyrepel Industrial Catalog Entitled "Protective Clothing Accessories and Supplies" Dated 1986.
Fyrepel Brochure Entitled "Firefighters Protective Clothing-Over 36 Years of Protection" Dated 1983.
Body-Guard Brochure Entitled "Body-Guard Apparel-1971 Series" Dated 9/1986.

*Primary Examiner*—Werner H. Schroeder
*Assistant Examiner*—Gloria Hale

[57] ABSTRACT

A garment is provided which is particularly suited for protecting its wearer against spills or splashes of hot organic liquids. The garment has comprises (a) a multi-layered outer shell that has a vapor-permeable, liquid-impermeable sheet of poly(tetrafluoroethylene) sandwiched between two fabrics of knitted or woven yarns of crystalline poly(m-phenylene isophthalamide) staple fibers and (b) an insulating inner liner.

14 Claims, 3 Drawing Sheets

GARMENT FOR PROTECTION AGAINST HOT LIQUIDS

CROSS REFERENCE TO RELATED APPLICATION

This application is a continuation-in-part of application Ser. No. 07/419,848 filed Oct. 11, 1989.

FIELD OF THE INVENTION

The present invention relates to a garment for protecting its wearer against splashes or spills of hot liquids, especially hot organic liquids, such as molten monomers or polymers. More particularly, the invention relates to a protective coverall comprising a particular multi-layered outer shell and an insulating inner liner, the shell and the liner each being permeable to vapor, thereby making the coverall "breathable".

BACKGROUND OF THE INVENTION

A variety of protective garments and coveralls are commercially available for protecting against various hazards. One such class of garments provides protection against splashes of corrosive liquids, hot liquids, molten metals and the like. A typical commercial garment for protecting its wearer against direct exposure to liquids of high temperature (i.e., about 150° C. and higher), usually has an outer shell which is designed to prevent penetration by the hot liquid and an inner liner which is designed to provide a further thermal barrier between the wearer and the heat source. Usually, the outer shell is very heavy and does not permit passage of vapor. When combined with a typical inner liner, the complete garment is usually very heavy, quite bulky and uncomfortable to wear. Therefore, it is an object of this invention to provide a garment that is lighter, has a higher vapor permeability, and is more comfortable to wear than known prior art garments intended for protection against hot liquids.

Other objects and advantages of the present invention will become apparent to those skilled in the art upon reference to the attached drawings and to the detailed description of the invention which hereinafter follows.

SUMMARY OF THE INVENTION

The present invention provides a garment that is particularly suited for protecting its wearer against splashes and spills of hot organic liquids. The garment has a multi-layered outer shell and an adjacent insulating inner liner. The outer shell comprises a laminate of a vapor-permeable, liquid-impermeable sheet of poly(tetrafluoroethylene) which is positioned between two fabrics of poly(m-phenylene isophthalamide) staple fiber yarns. The outermost surface layer of the outer shell (i.e., the layer farthest from the wearer's body) is a woven fabric of crystalline poly(m-phenylene isophthalamide) staple fiber yarns. Preferably, both fabrics of the outer shell are woven from poly(m-phenylene isophthalamide) staple fiber yarns and the shell weighs in the range of 150 to 300 g/m$^2$, most preferably, in the range of 180 to 250 g/m$^2$.

Preferably, the insulating inner liner comprises at least one layer of a thermally insulative material such that it provides a thermal insulation value or CLO value for the combination of both the outer shell and inner liner in the range of 0.2 to 2.0, most preferably in the range of 0.25 to 1.0. More preferably, the inner liner comprises at least two fibrous layers, of which the innermost layer is a woven or knitted fabric. Preferably, when the inner liner is attached to the outer shell, the liner also has one, two or three layers of spunlaced nonwoven fabrics, and weighs in the range of 100 to 250 g/m$^2$. Preferably, the spunlaced fabrics are made of aramid fibers. When the inner liner of the garment is in face-to-face relationship with the outer shell, but not attached thereto, the liner weighs in the range of 150 to 500 g/m$^2$, and comprises an innermost and an outermost fabric which are woven or knitted from staple fiber yarns and are quilted to and form the outer covering for one to five layers of spunlaced nonwoven fabrics. Preferably, the inner liner weight is in the range of 200 to 400 g/m$^2$ and the fibers of all the layers of the liner are made of aramid staple fibers.

BRIEF DESCRIPTION OF THE DRAWINGS

The invention will be better understood by reference to the attached drawings wherein.

DETAILED DESCRIPTION OF PREFERRED EMBODIMENTS

For convenience, several abbreviations are employed for use hereinafter. Their meanings are as follows:

MPD-I: poly(m-phenylene isophthalamide).
PPD-T: poly(p-phenylene terephthalamide).
PTFE: poly(tetrafluoroethylene).
DMT: dimethyl terephthalate.
BHET: bis(hydroxyethyl) terephthalate.
66-Nylon polyhexamethylene adipamide.
2GT polyethylene terephthalate.
Nomex ® poly(m-phenylene isophthalamide) fiber sold by E. I. Du Pont de Nemours & Co.
Kevlar ® poly(p-phenylene terephthalamide) fiber sold by E. I. Du Pont de Nemours & Co.

Figure 1:
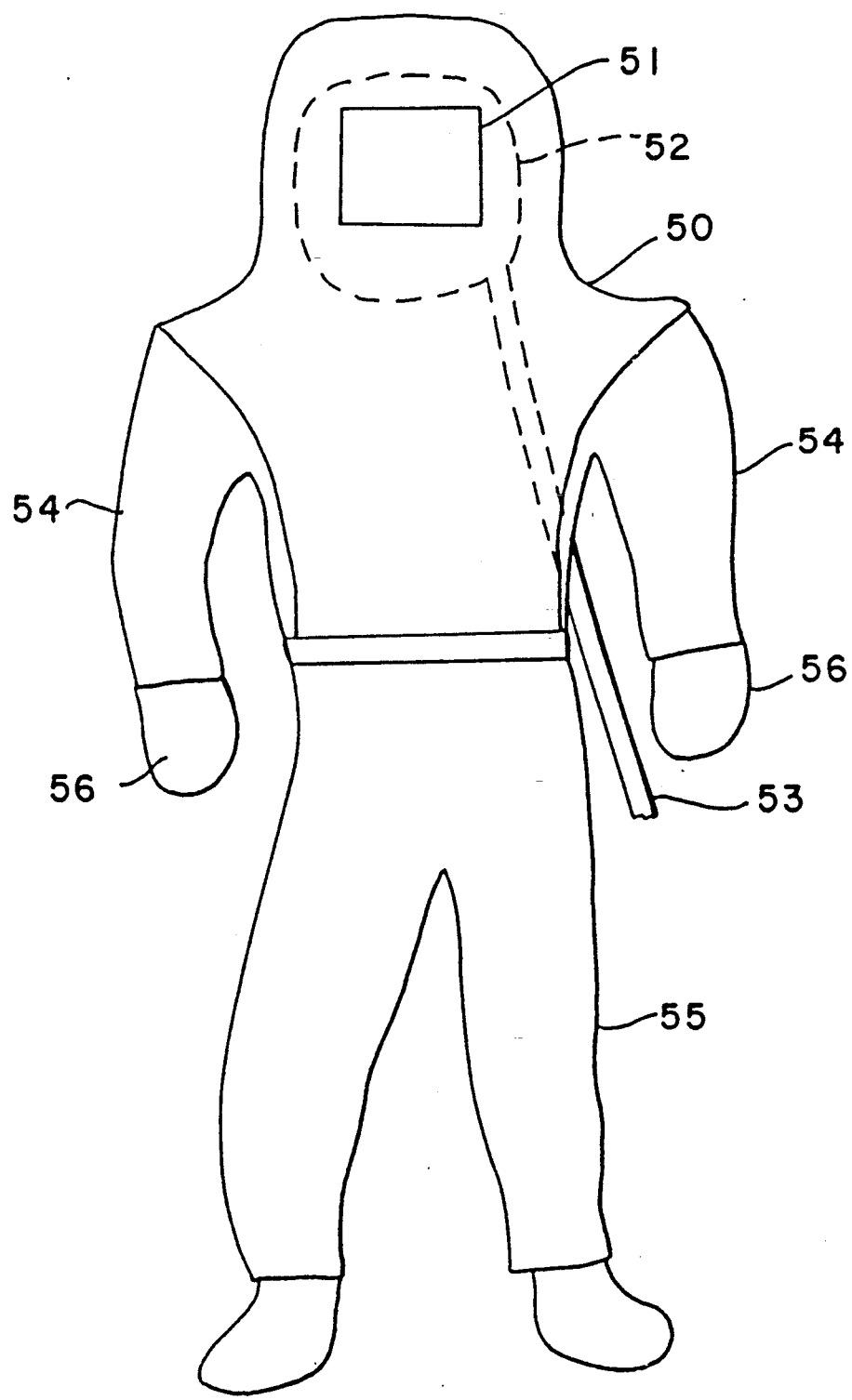
FIG. 1 illustrates a front view of a protective garment of the invention in the form of a coverall having a hood with front and back bibs 50 containing a window 51 and a respirator 52 attached to an air supply hose 53, shirt and arm portions 54, trouser portion 55 and separate, attachable gloves 56.
Figure 2:
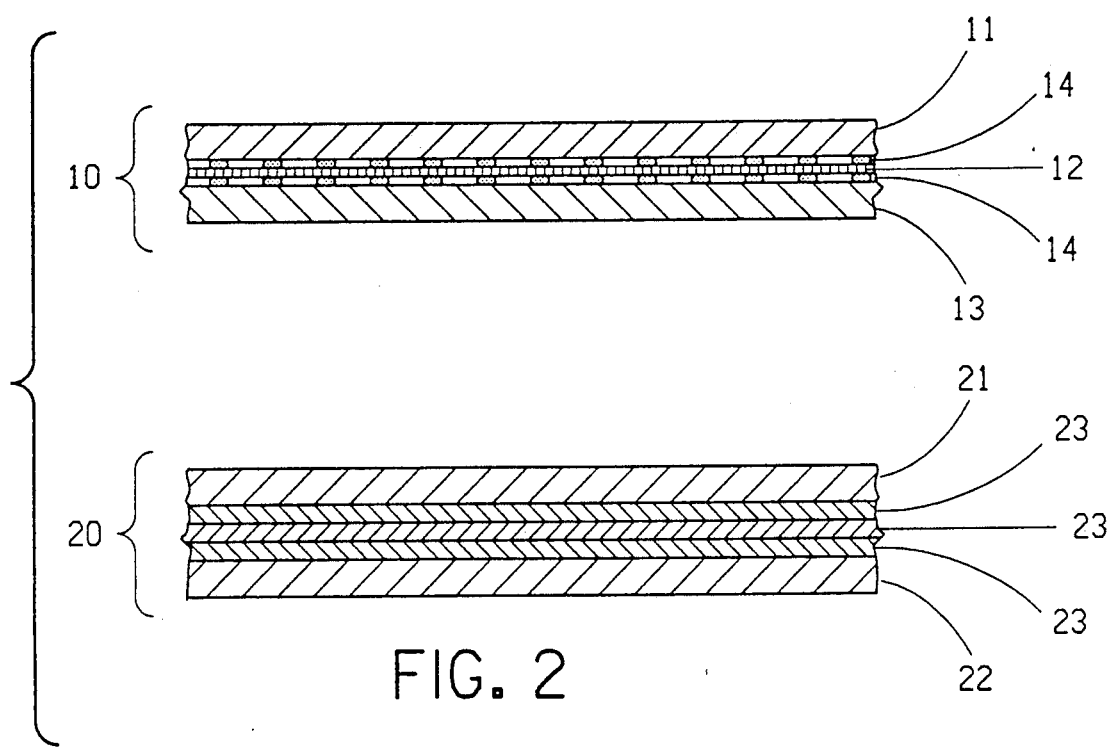
FIG. 2 is a cross-section of a preferred construction of the garment layers, comprising outer shell 10, which is resistant to penetration by hot liquids, and separate, insulating inner liner 20.
Figure 3:
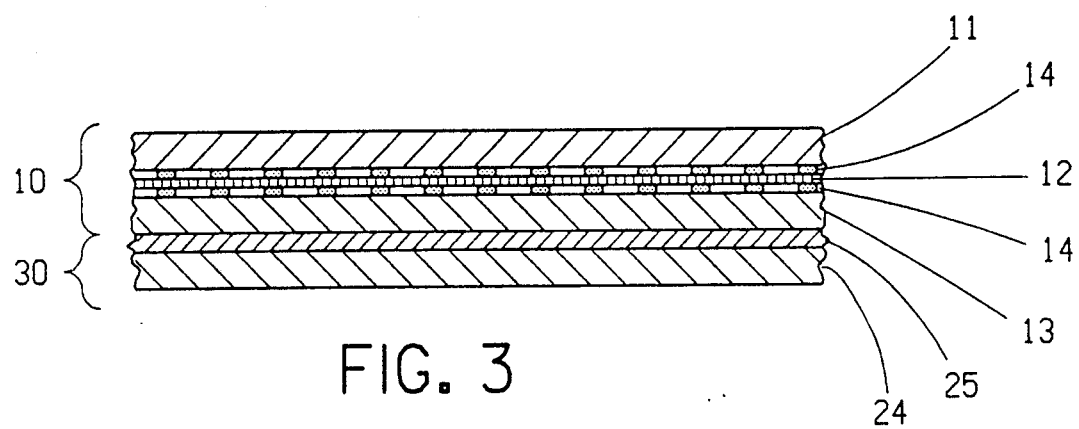
FIG. 3 is a cross-section of another preferred construction of the garment layers, comprising outer shell 10 attached, to insulating inner liner 30.

In accordance with the present invention, the protective garment of the invention comprises a multi-layered outer shell 10 which, as shown in FIG. 2, is separate though close to or even adjacent to an insulating inner liner 20. As shown in FIG. 3, outer shell 10 and inner liner 30 are attached to each other, for example, by stitching that does not penetrate through the outer shell or by an adhesive. Outer shell 10 is constructed in a manner that prevents hot liquids from penetrating the shell, but which permits vapor to pass through the shell from inside to outside the garment. Outer shell 10 works in cooperation with an inner liner that can be attached or separate from the outer shell. The inner liner provides thermal insulation between the hot-liquid-resistant outer shell and the skin of the person wearing the protective garment.

Outer shell 10 is a laminate comprising in succession, starting from the layer farthest from the wearer's body, an outermost woven fabric 11 of yarns of crystalline MPD-I staple fibers, a layer 12 of vapor-permeable, liquid-water-impermeable PTFE sheet and a fabric 13 of MPD-I staple fiber yarns.

PTFE sheet 12 is microporous, with a pore size such that the sheet is capable of resisting liquid water pressure in excess of 100 kPa without penetration of the water through the sheet, but also of permitting vapor to pass readily through the sheet. Generally, the PTFE sheet is stable to heat, in that it experiences no significant shrinkage when exposed to temperatures as high as 300° C. Such microporous PTFE sheets are available commercially.

Fabric 13 of the outer shell is a knit or woven fabric of yarns of MPD-I staple fibers, preferably of crystalline MPD-I staple fibers. The term "crystalline MPD-I staple fibers" refers to staple fibers which were cut from spun MPD-I filaments that had been stretched and heat crystallized by the process described in Alexander, U.S. Pat. No. 3,133,138, the entire description of which is hereby incorporated herein by reference.

The laminate is prepared by adhering the fabrics of MPD-I staple fiber yarns to the PTFE sheet with an adhesive in a manner which forms a securely attached laminate but permits the PTFE sheet to retain most of its microporous character. Preferably, the adhesive is a flame-retardent polyurethane adhesive, which is applied in a dot pattern to both sides of the PTFE sheet in such a way that the applied dots cover only about 25% of the surface of the sheet. The adhesive is designated 14 in FIGS. 2 and 3.

The total of weight of all of the layers of the outer shell, including the adhesive, is usually in the range of about 150 to about 300 g/m$^2$, preferably in the range of 180 to 250 g/m$^2$.

In a preferred embodiment of the invention, inner liner 20 comprises at least two fabrics 21 and 22, which may be knitted or woven. As shown in FIG. 2, liner 20 is separate from outer shell 10. Stitching to attach the shell and liner is thereby avoided. This, in turn, eliminates the possibility of stitching perforating the liquid-resistant PTFE layer 12 of outer shell 10.

The inner insulating liner of the garment of the invention preferably comprises from one to five spunlaced fabric layers 23. FIG. 2 illustrates the liner cross-section and shows three such spunlaced fabric layers 23. FIG. 3 illustrates the use of one spunlaced fabric layer 25 in the liner. All of the fabrics of the inner liner are fastened together, preferably by quilting stitches (not shown in the drawings). Spunlaced fabric layers 23 and 25 are preferably non-apertured and made of aramid staple fibers. Woven or knitted fabrics 21, 22 and 24 are preferably made from yarns of MPD-I staple fibers. Woven or knitted fabrics 21, 22 and 24 of the inner liner 20 or 30 protect the thermal insulating liner from damage during laundering or cleaning.

The total weight of all of the layers of the separate inner liner, including the thread used for quilting the layers, is usually in the range of 150 to 500 g/m$^2$, preferably in the range of 200 to 400 g/m$^2$.

In another preferred embodiment of the invention, as shown in FIG. 3, inner liner 30 is adjacent and attached to outer shell 10. In this embodiment, inner liner includes innermost layer 24 of woven or knitted fabric and one to three spunlaced fabrics 25, preferably of aramid fibers. Inner liner 30 is attached to the outer shell 10, for example, by stitching (not shown) at the seams only to minimize perforations in the outer shell.

The total weight of all of the layers of the attached inner liner is usually in the range of about 100 to 250 g/m$^2$.

The garment of the invention provides its wearer with improved protection against hot liquids, especially against hot organic liquids, which otherwise are not a hazard in the form of vapors. For example, as shown by the hot liquid exposure tests described hereinafter, a garment of the invention having a separate inner liner 20 which is formed with upper and lower woven fabrics of yarns of MPD-I staple fibers and three intervening spunlaced fabric layers, is capable of protecting its wearer from molten polyhexamethylene adipamide (66-nylon) at 290° C. or molten polyethylene terephthalate (2GT) at 301° C. In each case, the wearer would perceive no pain for at least 30 seconds after exposure to the molten polymer. Also, the garment provides the wearer with additional seconds to escape from less viscous, more penetrating hot liquids such as molten bis(hydroxyethyl)terephthalate (BHET) at a temperature of 215° C. and avoid getting burned. The garment gives the wearer at least 18 seconds to escape from the molten BHET before such hot liquid can raise the temperature of the innermost surface of the garment sufficiently for him to first perceive pain and then some additional seconds, if necessary, before he would receive a first degree burn. A lighter, more comfortable one-piece garment of the invention, with an outer shell 10 attached to an insulating inner liner 30, gives the wearer 18 seconds to escape from the somewhat less hazardous molten dimethyl terephthalate (DMT) at a temperature of 158° C. It should be noted that when the garment is in the form of coveralls, that it may also be provided in two pieces wherein separate trouser 55 and shirt portions 54 are provided.

In the non-limiting examples which follow, certain thermal test properties of the protective garments of the invention and their components are reported. These properties were measured by the following methods:

Hot Liquid Exposure Test. Fabric samples are tested substantially as set forth in ASTM F 955-85, "Standard Test Method for Evaluating Heat Transfer Through Materials for Protective Clothing Upon Contact With Molten Substances", except that the sensor board used for the tests described herein had only one calorimeter position. In each test, the board is mounted in a horizontal position with a fabric sample clamped over the calorimeter position. The calorimeter position comprises a copper disc that measured 0.95 cm (0.375 in) in thickness and 4 cm (1.57 in) in diameter with one sensor in the center of the disc and three other sensors equally spaced on a 2-cm (0.79-in) diameter circle. The copper disc, which is painted black, is mounted at the center of a square insulating board which measures 1.3-cm (0.5-in) thick and 135 cm (6 in) on each side. Each fabric sample is exposed to hot organic liquids of relatively low viscosity, such as molten DMT or molten BHET, having respective melting points of 158° and 215° C., by pouring 1.9 liters (2 qts) of the molten liquid in a steady stream, over a time period of 30 seconds, onto the horizontally mounted fabric sample.

Figure 4:
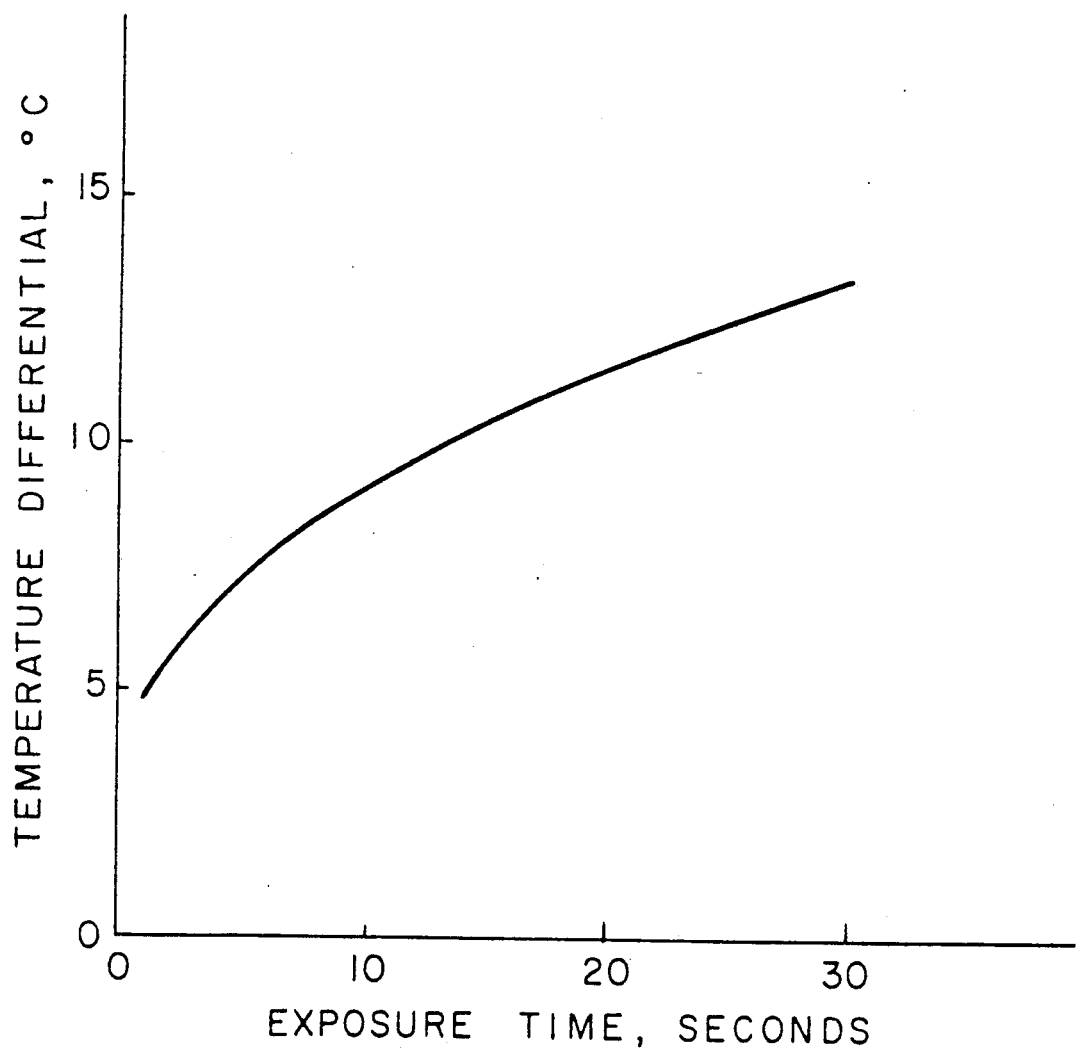
FIG. 4 is a graph of the data used for rating the protective value of fabrics in the hot liquid exposure test described hereinafter.

Fabric samples are also exposed to molten polymer, such as molten 66-nylon, by the following procedure. The spinneret is removed from a conventional unit for melt-spinning polymer, leaving an opening through which molten polymer is extruded at the rate of 418 ml per minute. A sample of test fabric, horizontally mounted on the calorimeter position, is placed 7.6 cm (3 in) below the opening and exposed to the molten polymer stream for 30 seconds. Calorimeter readings are recorded to determine the degree of protection that would be afforded to human tissue, if it were covered by such a test fabric when subjected to such a flow of hot liquid. The time required by the calorimeter to record a temperature rise that would correspond to a condition that would cause a person to perceive pain is measured. Such data, correlating the calorimeter reading to the perception of pain in human tissue, is provided in Table 1 of ASTM F 1060-87 and is reproduced below and plotted in FIG. 4.

| Temperature Differential | | Seconds to Reach Perception of Pain |
| --- | --- | --- |
| °C. | °F. | |
| 4.74 | 8.53 | 1.0 |
| 5.28 | 9.51 | 1.5 |
| 5.71 | 10.27 | 2.0 |
| 6.22 | 11.20 | 3.0 |
| 7.22 | 13.00 | 5.0 |
| 8.04 | 14.47 | 7.0 |
| 8.74 | 15.73 | 10.0 |
| 11.26 | 20.27 | 20.0 |
| 13.33 | 24.00 | 30.0 |

The time required for human tissue to experience a second degree burn is about twice the time required to perceive pain. In each test reported herein, the hot liquid was poured or extruded onto the test fabric at steady rate for 30 seconds and calorimeter readings of temperature differential were recorded as a function of exposure time and plotted on a graph having the same scale as FIG. 4. A transparent overlay of the curve of FIG. 4 was used to estimate the protection afforded by the fabric against the hot liquid, in terms of time until pain was perceived.

Thermal Resistance Test. The insulating values of fabric samples used to make a garment (outer shell plus inner liner) of the present invention are determined and reported in terms of CLO, a unit of thermal resistance used in evaluating the warmth of clothing. A unit of CLO is defined as the thermal resistance which allows passage of one kilogram calorie per square meter of the fabric sample per hour with a temperature difference of 0.18° C. between two surfaces. The measurement is performed substantially as described on page 110 of an article by J. L. Cooper and M. J. Frankosky, "Thermal Performance of Sleeping Bags," Journal of Coated Fabrics, Volume 10, pages 108-114 (October 1980). As described in the article, data is obtained by placing the samples between plates in a thermal conductivity apparatus (the "Rapid-k" apparatus made by Dyna Tech, Boston, Mass., or the equivalent). The samples are 30.5 cm×30.5 cm (12 in×12 in) squares, and a minimum thickness of 12.7 mm (0.5 in) is used, using multiple plies if necessary and dividing the CLO value obtained by the number of plies. The thermal conductivity of the samples is measured under a load of 0.0138 kPa (0.002 psi), the thickness of each sample in mm being measured under the same load. The apparatus is calibrated by making thermal conductivity measurements on a high density fiberglass batt having a known thermal conductivity value and good dimensional stability so that it can be used repeatedly as a standard for calibrating the apparatus. In measuring CLO values for the fabrics of the garments of the present invention, the hot plate is set at 121° C. (250° F.) and the cold plate is set at 32° C. (90° F.).

The thermal conductivity values for the fabric samples which are measured by the apparatus can be converted to mm/CLO values using the conversion factors provided in Table 1 of ASTM Designation D 1518-85 (Standard Test Method for Thermal Transmittance of Textile Materials), and the CLO values for the fabric samples can be calculated from the mm/CLO values and the measured thicknesses of the fabric samples in mm.

The invention is further illustrated by the following non-limiting examples of preferred embodiments. The results reported in these examples are believed to be representative, but do not constitute all the runs involving the indicated materials. All percentages in the examples are by weight, unless stated otherwise.

EXAMPLE 1

This example describes the construction and testing of an outer shell fabric and a separate inner liner fabric, suitable for use in a launderable protective garment of the invention. The tests demonstrate the suitability of the combined fabrics for protecting against hot liquids at temperatures in the range of 180° to 300° C.

A laminate was formed of the following layers of material, in the order listed:

(1) a commercially available, woven, pajama-check fabric of poly(m-phenylene isophthalamide) (MPD-I) staple fiber yarns ("the MPD-I woven fabric") weighing 109 g/m² (3.2 oz/yd²);

(2) a commercially available, heat stable, microporous sheet of poly(tetrafluoroethylene) ("the PTFE sheet") measuring 0.038 -mm (0.0015-in)thick, weighing 17 g/m² (0.5 oz/yd²), having a pore size of 0.0056 mm (0.00022 in), and being capable of resisting a water pressure of 414 kPa (60 psig); and (3) a commercially available, jersey-knit fabric of poly(m-phenylene isophthalamide (MPD-I) staple fiber yarns ("the MPD-I knit fabric") weighing 58 g/m²(1.7 oz/yd²).

The MPD-1 woven fabric and the MPD-I knit fabric were adhered to the PTFE sheet with 17 g/m² (0.5 oz/yd²) of a flame-retardant polyurethane adhesive. The adhesive was applied in a dot print pattern which covered 25% of the surface of the sheet. The resultant laminate was used as an outer shell fabric of the invention.

A non-apertured, spunlaced nonwoven fabric of 100% PPD-T staple fibers ("the spunlaced PPD-T fabric") weighing 51 g/m² (1.5 oz/yd²) was prepared substantially as described in Example 4 of Blaustein et al, U.S. Pat. No. 4,750,443, which description is hereby incorporated herein by reference. A quilt, comprising a top layer of the MPD-I woven fabric, three layers of the spunlaced PPD-T fabric, and an innermost layer of the MPD-I woven fabric were stitched together with an MPD-I facing thread and a PPD-T bobbin thread. This five-layer quilt was used as an inner liner fabric of the invention. The thusly prepared outer shell fabric was placed atop the five-layer quilt inner liner fabric, so that the MPD-I woven fabric, with the PTFE sheet directly beneath it, formed the outermost layer. The entire assembly, similar to the assembly shown in cross-section in FIG. 2, was clamped upon a calorimeter position in accordance with the "Hot Liquid Exposure Test" procedure described hereinbefore and then exposed to hot liquids, to show the suitability of the combined fabrics for making a garment that would be suitable for protecting its wearer against splashes and spills of hot organic liquids.

In one test, the test assembly was exposed for 30 seconds to a 418 ml/min flow of molten 66-nylon at 290° C. The calorimeter readings indicated that a wearer of a garment made from such an assembly of outer shell and separate inner liner would perceive no pain during the entire 30-second exposure period. In a second test, the assembly was exposed for 30 seconds to a 418-ml/min flow of molten 2GT at 301° C. In this second test, the calorimeter readings also indicated that no pain would be perceived during the entire 30-second exposure period. In a third test, the test assembly was exposed for 30 seconds to a flow of molten BHET at 215° C. The third test showed that pain would be perceived after an exposure of 18.5 seconds. Molten BHET is a thin (i.e., relatively low viscosity), penetrating liquid, and therefore, presents a more severe hazard than the molten polymers of considerably higher temperatures. Protection against pain perception for 18.5 seconds is considered highly acceptable for protective garments intended for guarding against spills of splashes of hot organic liquids.

The CLO value for a stack of three plies of the combined outer shell fabric and five-layer quilted inner liner was determined in accordance with the Thermal Resistance Test. The CLO value for the three plies was 1.96. Accordingly, the CLO value for one combined outer shell and five-layer inner liner quilt was 0.65.

EXAMPLE 2

In this example, a three-layer outer shell fabric and a two-layer inner liner fabric, suitable for making a launderable garment that would protect its wearer against hot liquids at temperatures of up to about 180° C., was prepared and tested.

A quilt comprising a top layer of the PPD-T nonwoven fabric of Example 1 and a lower layer of the MPD-I woven fabric of Example 1 was stitched together with an MPD-I facing thread and a PPD-T bobbin thread to form a two-layer inner liner fabric. The outer shell fabric of Example 1 was placed atop the two-layer inner liner fabric, so that the MPD-I woven fabric with the PTFE sheet directly beneath became the outermost layer and the MPD-I woven fabric of the two-layer inner liner fabric became the lowermost fabric, of the assembled layers. The Hot Liquid Exposure Test was performed on the assembly with a 30-second flow of molten DMT at 158° C. The results indicated that pain would not be perceived before 18 seconds of exposure. Such protection for 18 seconds is considered to be highly satisfactory.

The CLO value for a stack of six plies of the combined outer shell fabric and two-layer inner liner fabric was determined in accordance with the Thermal Resistance Test. The CLO value for all six plies was 2.0. Accordingly, the CLO value for one combined outer shell and two-layer inner liner quilt was 0.33.

For purposes of relatively low viscosity liquids, like molten DMT, a suitable range of CLO values for one combined outer shell and inner liner would include from about 0.25 to about 0.40. For purposes of higher viscosity polymers, like molten 66-nylon, a suitable range of CLO values for one combined outer shell and inner liner would include from about 0.60 to about 1.0.

Although particular embodiments of the present invention have been described in the foregoing description, it will be understood by those skilled in the art that the invention is capable of numerous modifications, substitutions and rearrangements without departing from the spirit or essential attributes of the invention. Reference should be made to the appended claims, rather than to the foregoing specification, as indicating the scope of the invention.

We claim:

1. A garment, particularly suited for protecting its wearer against splashes and spills of hot organic liquids, having a multi-layered outer shell and an adjacent insulating inner liner, the outer shell comprising a laminate of a vapor-permeable, liquid-impermeable sheet of poly(tetrafluoroethylene) which is positioned between two fabrics of poly(m-phenylene isophthalamide) staple fiber yarns, the outermost surface layer of the shell being a woven fabric of crystalline poly(m-phenylene isophthalamide) yarns.

2. A garment in accordance with claim 1 wherein both fabrics of the outer shell are woven from poly(m-phenylene isophthalamide) staple fiber yarns.

3. A garment in accordance with claim 1 wherein the outer shell weighs in the range of 150 to 300 g/m$^2$.

4. A garment in accordance with claim 3 wherein the outer shell weighs in the range of 180 to 250 g/m$^2$.

5. A garment in accordance with claim 1 wherein the inner liner comprises at least one layer of a thermally insulative material, such that the CLO value for the combination of both the outer shell and inner liner is in the range of 0.2 to 2.0.

6. A garment in accordance with claim 1 wherein the inner liner comprises at least one layer of a thermally insulative material, such that the CLO value for the combination of both the outer shell and inner liner is in the range of 0.25 to 1.0.

7. A garment in accordance with claim 1 wherein the insulating inner liner comprises at least two fibrous layers, of which the innermost layer is a woven fabric.

8. A garment in accordance with claim 7 wherein the inner liner is attached to the outer shell, the inner liner has one, two or three layers of a spunlaced nonwoven fabric adjacent the innermost layer, and the total weight of all layers making up the inner liner being in the range of 100 to 250 g/m$^2$.

9. A garment in accordance with claim 8 wherein the spunlaced nonwoven fabrics are made of aramid fibers.

10. A garment in accordance with claim 7 wherein the inner liner is in face-to-face relationship with the outer shell, but not attached thereto, the inner liner comprising an innermost and an outermost fabric which are woven from staple fiber yarns, the innermost and outermost fabrics being quilted to and sandwiching one to five layers of a spunlaced nonwoven fabric of staple fibers, and the total weight of all layers making up the inner liner being in the range of 150 to 500 g/m$^2$.

11. A garment in accordance with claim 10 wherein the inner liner weight is in the range of 200 to 400 g/m$^2$ and the fibers of all the layers of the liner are made of aramid staple fibers.

12. A garment in accordance with claim 1 wherein the insulating inner liner comprises at least two fibrous layers, of which the innermost layer is a knitted fabric.

13. A garment in accordance with claim 7 wherein the inner liner is in face-to-face relationship with the outer shell, but not attached thereto, the inner liner comprising an innermost and an outermost fabric which are knitted from staple fiber yarns, the innermost and outermost fabrics being quilted to and sandwiching one to five layers of a spunlaced nonwoven fabric of staple fibers, and the total weight of all layers making up the inner liner being in the range of 150 to 500 g/m$^2$.

14. A garment in accordance with claim 13 wherein the inner liner weight is in the range of 200 to 400 g/m$^2$ and the fibers of all the layers of the inner liner are made of aramid staple fibers.

* * * * *